R. H. BOWEN.
PRESSED METAL PULLEY.
APPLICATION FILED SEPT. 1, 1917.
1,255,506.
Patented Feb. 5, 1918.
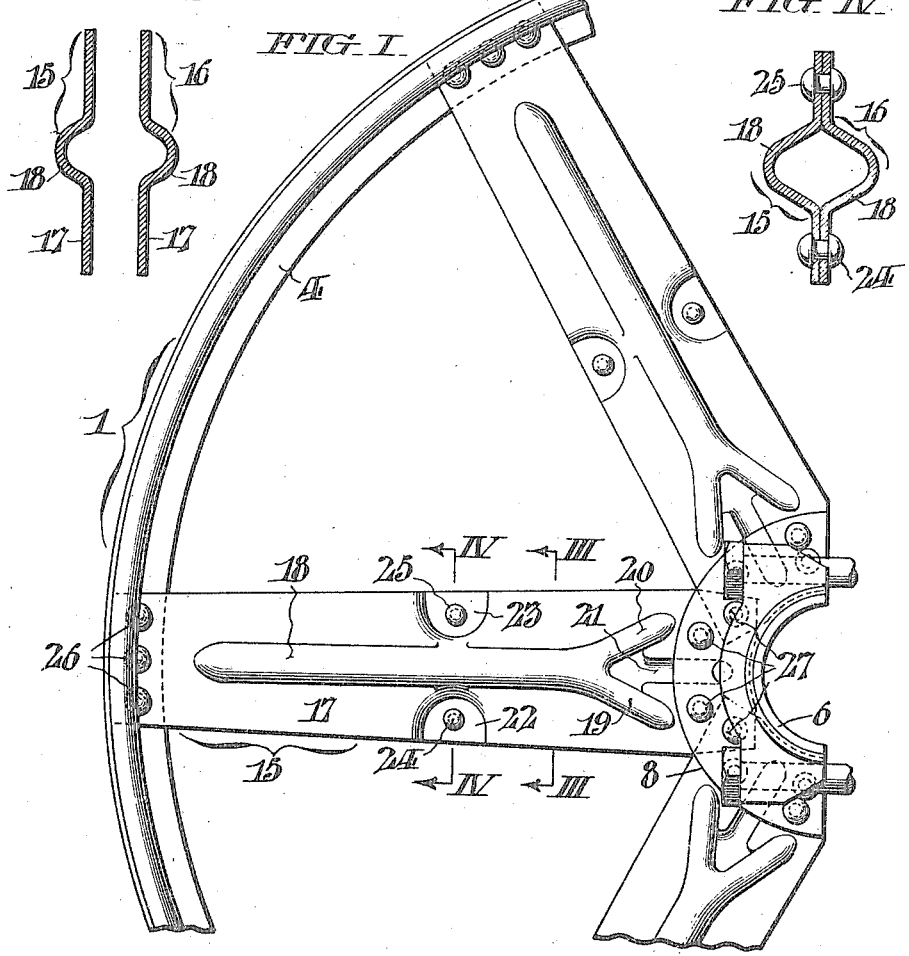
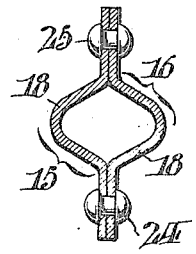
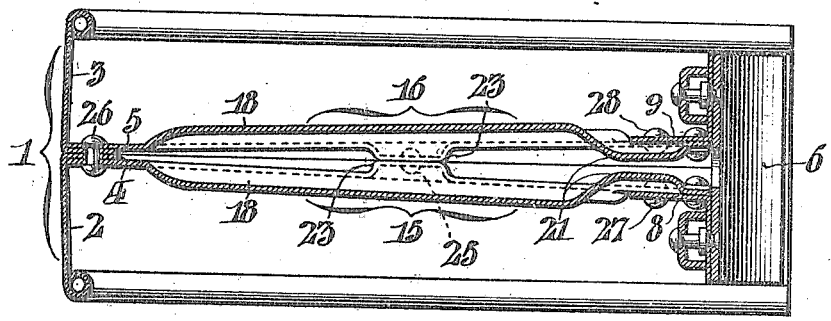
Inventor
Russell H. Bowen,
Witnesses

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

PRESSED-METAL PULLEY.

1,255,506.  Specification of Letters Patent.  Patented Feb. 5, 1918.

Application filed September 1, 1917. Serial No. 189,303.

*To all whom it may concern:*

Be it known that I, RUSSELL H. BOWEN, of Philadelphia, in the county of Philadelphia and State of Pennsylvania, have invented certain new and useful Improvements in Pressed-Metal Pulleys, whereof the following is a specification, reference being had to the accompanying drawings.

In the drawings, Figure I, represents, in side elevation, a portion of a pulley showing two of the composite spokes embodying my invention.

Fig. II, is a longitudinal section through one of the composite spokes on the line of the main axis thereof.

Figs. III, and IV, are respectively transverse sections of the spoke on planes indicated by the numerals 3, and 4, respectively.

My invention relates to a pulley having spoke members composed of two similar strips of pressed steel, or other metal, the outer extremities of the two elements of the spoke converging to a region of attachment to the pulley rim and their inner extremities diverging to a region of attachment to the pulley hub.

The object of my invention is to obtain from minimum amount of metal in the composite spoke member a high degree of rigidity, while preserving a contour of a character advantageous for running.

Referring to the drawings, 1, represents the rim of the pulley, in this instance indicated as made up of two similar annular bands 2, and 3, respectively, having at their meeting edges inwardly turned flanges 4, and 5. 6 represents the hub shell of the pulley carrying on its outer face the flanged annular bands 8, and 9, which serve as the rings for attachment for the spoke members. Each composite spoke is made up of two similar members 15, and 16, respectively, which are similar in construction, comprising a substantially flat plate 17, provided throughout a portion of its length with a longitudinal externally raised rib 18, which, at its inner extremity is preferably bifurcated and continued in bifurcated form as shown at 19, and 20, a reverse internal depression 21, being preferably located in the line of prolongation of the main rib between the bifurcated portions. At or near the longitudinal center of the spoke plate 17, I form two inwardly projecting bosses 22, and 23, respectively, approximately semi-circular in general outline, and having flat bottoms, the depth or extent of inward projection being such that when the two spoke plates are mounted in their combined position the flat bases of the bosses shall fit together in close contact, and constitute an extended bearing surface. The diametric edge of the semi-circular boss is located at the extreme outer edge of the spoke plate, and the arc portion extends to a point close to the central longitudinal rib, so that the wall of the boss, at the region adjacent to the rib, practically merges into the base portion of the latter. Rivets 24, and 25, are preferably applied at the bosses, so that the two spoke plates may be clamped firmly together with the bottoms of the respective bosses fitting snugly in contact with one another. The composite spoke member thus constituted is connected to the rim by arranging the outer extremities of the respective spoke plates to embrace the inwardly projecting flanges 4, and 5, of the rim, and riveting them thereto as shown at 26. The inner extremities of the spoke members are preferably embraced between the annular flanges 8, and 9, of the hub rings and are secured thereto by means of rivets 27, and 28. It will thus be seen that although the two elements of the spoke member are separated from one another throughout almost their whole length, to an extent sufficient to afford the desired degree of stability for the composite spoke as a whole, they are provided with an extended interposed bearing at or near the longitudinal central region, at which point the strains tending to bend them exert much influence.

Having thus described my invention, I claim:

In a pressed metal pulley, the combination of a pair of similar spoke plates, each having a central longitudinal rib extending throughout the greater portion of its length, and a pair of inwardly projecting flat bottomed bosses extending from the edge of the spoke member toward the adjacent edge of the rib, the depth of said depressions corresponding to the distance of separation of the spoke plates, whereby an extended flat bearing for the proximate faces is afforded; a pulley rim comprising a flanged portion secured to the outer extremities of the spoke plates; and a hub member having flanges secured to the inner extremities of the spoke plates, substantially as set forth.

In testimony whereof, I have hereunto signed my name at Philadelphia, Pennsylvania, this thirtieth day of August, 1917.

RUSSELL H. BOWEN.

Witnesses:
JAMES H. BELL,
E. L. FULLERTON.